United States Patent [19]

Brooks et al.

[11] 4,239,035
[45] Dec. 16, 1980

[54] SOLAR HEATING METHOD

[75] Inventors: Richard J. Brooks; Thomas W. Marson, both of Seattle, Wash.

[73] Assignee: The Chemithon Corporation, Seattle, Wash.

[21] Appl. No.: 909,012

[22] Filed: May 24, 1978

[51] Int. Cl.³ .............................................. F24J 3/02
[52] U.S. Cl. ................................. 126/452; 126/900; 126/445; 126/432
[58] Field of Search .............. 126/270, 271, 900, 450, 126/444, 445, 452, 432; 252/353, 359 A; 237/1 A; 165/2

[56] References Cited

U.S. PATENT DOCUMENTS

| 3,449,261 | 6/1969 | Ross, Jr. ........................ 252/353 X |
| 3,617,207 | 11/1971 | Benson .............................. 252/353 |
| 3,934,323 | 1/1976 | Ford et al. ........................ 126/271 |
| 3,997,580 | 12/1976 | Morehouse ..................... 252/353 X |
| 4,047,518 | 9/1977 | Anderson ........................... 126/271 |
| 4,055,163 | 10/1977 | Costello et al. ................... 126/271 |
| 4,074,705 | 2/1978 | Robinson, Jr. et al. ......... 126/900 X |
| 4,083,490 | 4/1978 | Cunningham et al. .......... 126/900 X |
| 4,114,597 | 9/1978 | Erb ..................................... 126/270 |
| 4,116,222 | 9/1978 | Seifried ............................... 126/271 |
| 4,170,984 | 10/1979 | Scheffee ......................... 126/900 X |

Primary Examiner—James C. Yeung
Assistant Examiner—Larry Jones
Attorney, Agent, or Firm—Merriam, Marshall & Bicknell

[57] ABSTRACT

A liquid containing carbon particles in a predetermined concentration is circulated through a multiplicity of channels in a solar panel to heat the liquid which is then circulated through a heat exchanger. The solar panel is clear and uncolored, and the surfaces of the panel contacting the liquid are wetted with a wetting agent added to the liquid. The carbon particles are also wetted. The liquid is uniformly distributed through all the channels in the panel.

14 Claims, 5 Drawing Figures

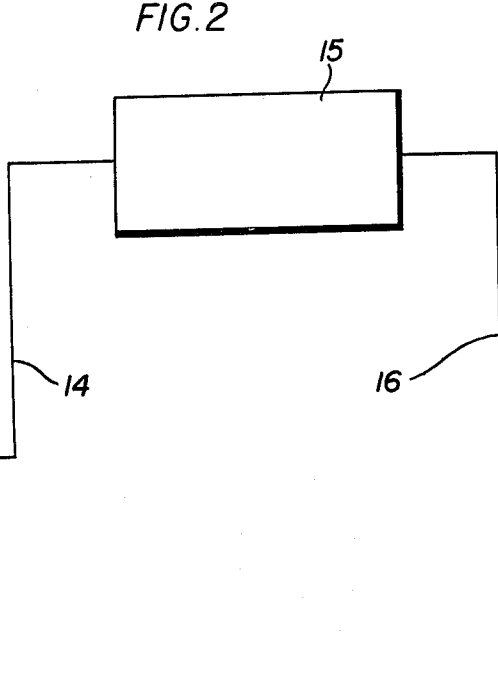
FIG. 2
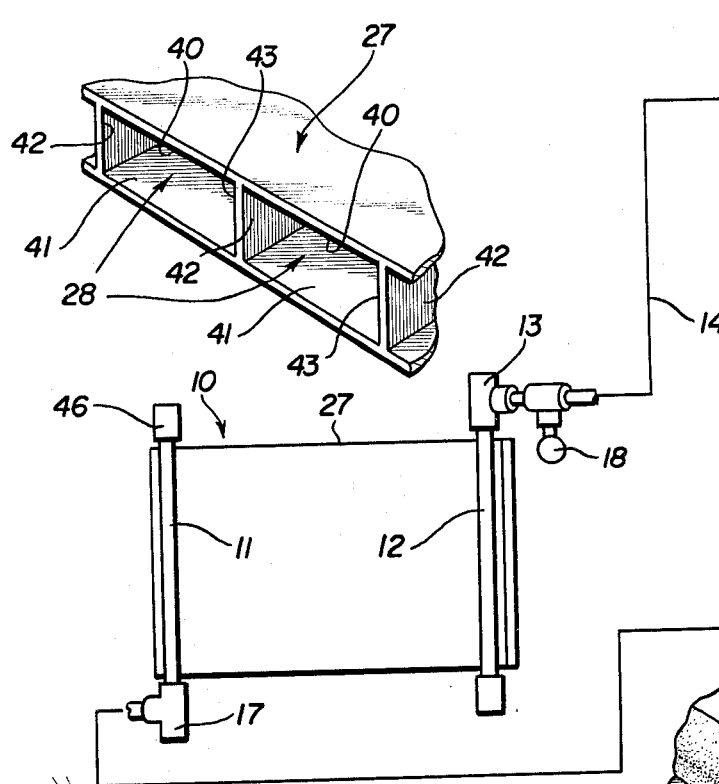
FIG. 3
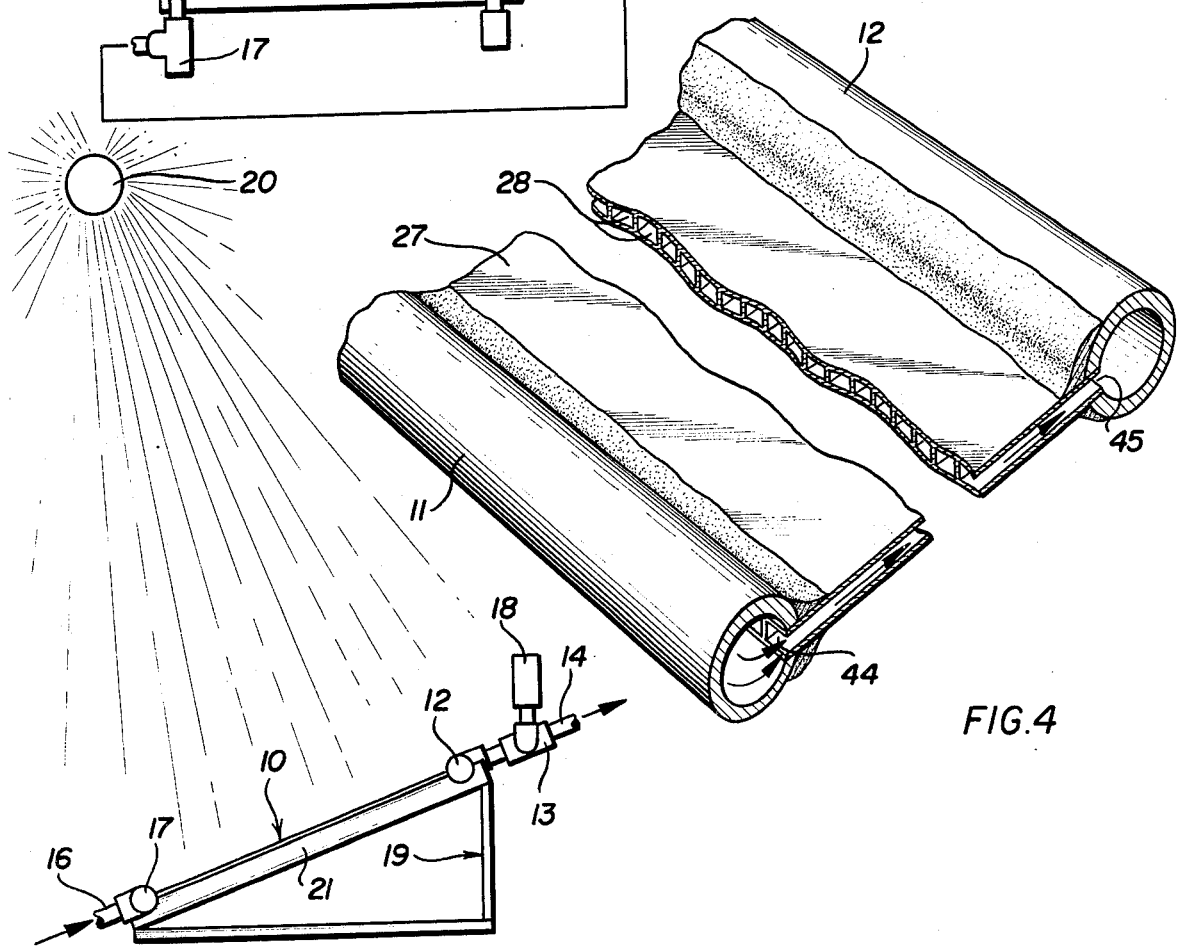
FIG. 4
FIG. 5

SOLAR HEATING METHOD

BACKGROUND OF THE INVENTION

The present invention relates generally to solar heating methods and more particularly to solar heating methods in which a heat exchanging, fluid medium is heated by circulating the medium through a panel exposed to solar radiation.

In solar heating methods, it is conventional to circulate a heat exchanging, fluid medium through a panel exposed to solar radiation to heat the fluid medium. The fluid medium is then circulated through a heat exchanger to transfer, to a system external to the fluid medium, the heat absorbed by the fluid medium while circulating through the panel. Solar heating methods generally utilize an inclined panel having upper and lower interior surfaces spaced apart to define therebetween one or more inclined channels through which the fluid medium is circulated. An example of such a panel is disclosed in Brackman Defensive Publication No. T952,004, dated Nov. 2, 1976.

Harter, U.S. Pat. No. 4,060,070, discloses a solar heating panel composed of darkened material and having a multiplicity of parallel tubes through which the fluid medium is circulated.

Hastwell, U.S. Pat. No. 4,062,351, discloses a solar heating method in which the fluid medium is circulated through a clear, undarkened panel, but the fluid medium is a dark fluid such as oil. Menardi, U.S. Pat. No. 3,939,819, discloses a solar heating method in which the fluid medium contains a darkening ingredient, such as carbon black particles or a dye.

Ward, U.S. Pat. No. 3,934,323 discloses a solar heating method in which a fluid is circulated through an inclined panel having a multiplicity of parallel channels through which the fluid flows.

The solar heating methods disclosed in the above-noted prior art have problems which interfere with the efficiency of converting solar radiation to usable heat energy or otherwise interfere with the optimum operation of the solar heating panel. For example, particles added to the fluid medium to assist in the absorption of radiant energy often tend to stick to the surface of the panel or to settle out of suspension in the fluid. Bubbles or air spaces can form adjacent the upper interior surface of the panel, and this interferes with the transfer of heat energy from the solar radiation to the fluid medium. The fluid medium can become non-uniformly distributed among the several panel channels. One or more of these or other problems are inherent in the solar heating methods disclosed in the above-noted prior art patents.

SUMMARY OF THE INVENTION

A solar heating method in accordance with the present invention circulates a fluid medium or liquid, such as water, through a clear, inclined panel exposed to solar radiation and having upper and lower interior surfaces spaced apart to define therebetween an inclined channel for the fluid medium. A multiplicity of adjoining channels are included in the panel. The fluid medium contains carbon black particles suspended therein.

Numerous problems associated with prior art solar heating panels have been eliminated. For example, the carbon particles suspended in the fluid medium are wetted with a wetting agent added to the fluid medium, and this keeps the carbon particles from sticking to the surfaces defining the channels.

The interior of the upper panel surface is wetted with a wetting agent added to the fluid medium. In addition, the panel is completely filled, and bubble formation adjacent the upper interior panel surface is prevented so that the liquid is in continuous, uninterrupted contact with the upper interior panel surface.

The concentration of the carbon black particles in the liquid are controlled within the range 2-5 grams per liter of liquid to maximize the efficiency with which radiation energy is transferred to the fluid medium.

Each of the multiplicity of parallel channels in the panel is completely filled with an inclined column of liquid having a pair of opposite ends. A supply column of liquid, having upstream and downstream ends, is flowed transversely to the inclined, parallel columns of liquid and in adjoining contact with one end of each. Each of the inclined columns is supplied with liquid from the supply columnmn at a location where the end of the inclined column joins the supply column. The supply column has a cross-sectional area less than the combined cross-sectional areas of the adjoining ends of the inclined columns of liquid. A uniform distribution of liquid into each inclined column is assured by providing the supply column of liquid with a cross-sectional area greater than 10% of the combined cross-sectional areas of the adjoining ends of the inclined columns of liquid, to avoid a substantial pressure drop along the supply columnn between its upstream and downstream ends.

Other features and advantages are inherent in the method claimed and disclosed or will become apparent to those skilled in the art for the following detailed description in conjunction with the accompanying diagrammatic drawings.

BRIEF DESCRIPTION OF THE DRAWINGS

FIG. 2 is a schematic of a solar heating system employing the panel assembly of FIG. 1, all in accordance with an embodiment of the present invention;

FIG. 3 is an enlarged, fragmentary, perspective of a portion of a panel from the assembly of FIG. 1;

FIG. 4 is a fragmentary perspective of the panel from the assembly of FIG. 1; and FIG. 5 is a side view of the panel assembly of FIG. 1 in an inclined, operative disposition.

DETAILED DESCRIPTION

Figure 1:
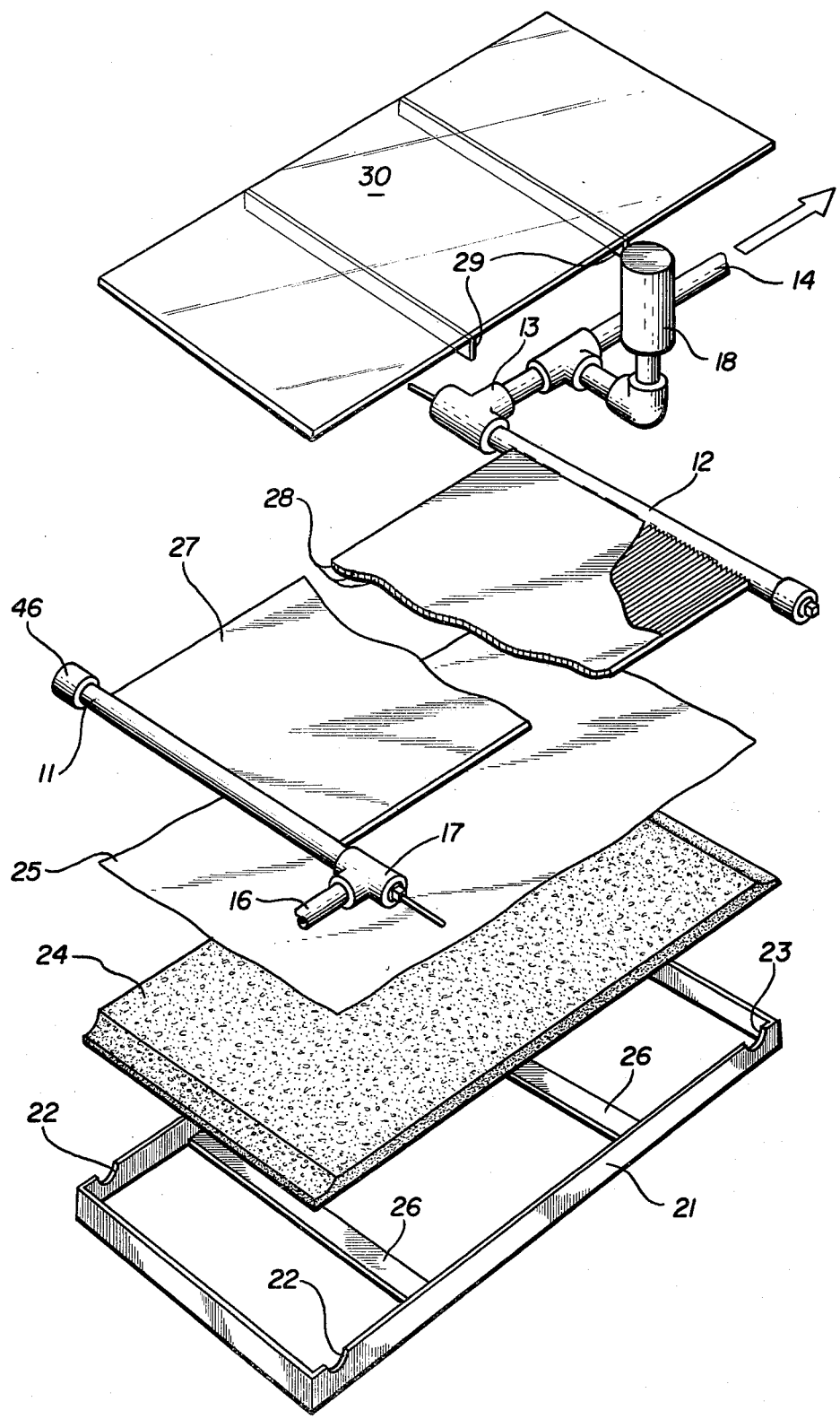
FIG. 1 is an exploded perspective of a panel assembly used in an embodiment of solar heating method in accordance with the present invention.

Referring initially to FIG. 2, indicated generally at 10 is a solar heating panel assembly having a panel 27 (FIG. 1) provided with a supply header 11 and a return header 12. Attached to one end of return header 12 is an outlet coupling 13 to which is connected a surge tank 18. Outlet coupling 13 communicates with a return line 14 communicating with one side of a heat exchanger 15 having another side communicating with a supply line 16 in turn communicating with an inlet coupling 17 on supply header 11.

In its operative position, panel assembly 10 is inclined relative to the sun 20 (FIG. 5), and liquid is pumped upwardly through inclined panel 27, from supply header 11 located at the lower end of panel 10 to return header 12 located at the upper end of panel 10, by a pump (not shown) which may be located along line 14 or line 16. Liquid is withdrawn from panel 27 through return header 12 from which the liquid flows through line 15 to heat exchanger 15. Heat from solar radiation is absorbed by the liquid as it circulates through panel 27 and is removed from the liquid in heat exchanger 15. The liquid is then returned through line 16 to supply header 11 of panel 27.

Referring to FIG. 1, panel assembly 10 comprises a wooden frame 21 having peripheral grooves 22, 22 and 23, 23 at opposite ends thereof for respectively receiving supply header 11 (in grooves 22, 22) and return header 12 (in grooves 23, 23). Wooden frame 21 is a box frame having a rectangular configuration, and it also has a pair of internal cross members 26, 26. Within wooden frame 21, atop cross members 26, 26, lies a layer of insulation material 24, (e.g. a slab of foamed plastic), and atop insulation layer 24 is a sheet of aluminum foil 25. Resting atop aluminum foil sheet 25 is panel 27 having a multiplicity of channels 28, 28. Panel 27 is integral with supply header 11 and return header 12. Panel 27 is composed of clear, undarkened, translucent plastic material, such as polycarbonate. Spaced above panel 27 by support members 29, 29 is a transparent top member 30 composed of clear plastic, for example.

Panel assembly 10 is supported in the inclined position illustrated in FIG. 5 by a support frame indicated generally at 19. When circulation of liquid through panel 27 is stopped, as by shutting off the solar heating system's pump, liquid drains out of inclined panel 27 through supply header 11 into supply line 16 and from there into any convenient storage receptacle (not shown) connected to supply line 16 by a conventional arrangement of appropriate piping and valving (not shown). Because liquid drains from panel 27 when the pump is inoperative, there is little or no chance for the liquid to freeze in panel 27 during cold weather. Accordingly, the liquid need not be provided with antifreeze, and this can result in a substantial saving.

Referring now to FIG. 3, each of the multiplicity of channels 28 in panel 27 comprises an upper interior surface 40, a lower interior surface 41 spaced from upper surface 40, and a pair of opposed side interior surfaces 42, 43. As shown in FIG. 4, each channel 28 communicates with supply header 11 at an inlet 44 and communicates with return header 12 at an outlet 45.

The fluid medium circulating through panel 27 is composed essentially of water with carbon particles suspended therein. In operation, each of channels 28 is completely filled with liquid so that liquid is in continuous, uninterrupted contact with the upper interior surface 40 of each channel 28.

The liquid is pumped upwardly through inclined panel 27 from the bottom (at supply header 11) to the top (at return header 12). This assists in maintaining the panel, and channels 28 therein, completely filled with liquid. Completely filling the channels can also be accomplished if the liquid is circulated in the opposite direction, in other words, entering panel 27 from header 12 and leaving panel 27 through header 11, so long as a sufficient back pressure is maintained on the panel.

As indicated above, the preferable fluid medium is water, although other liquids may be used. The transfer of radiation energy to the water is enhanced by the carbon particles suspended in the water. The carbon particles absorb radiation energy and transfer it to the water. A dark dye would not perform this function. Dark particles are necessary.

In order to maximize the absorption of radiation energy into the liquid circulated through channels 28, it is important to prevent bubble formation adjacent upper interior panel surface 40. Any bubble or air space adjacent upper interior panel surface 40 acts as an insulation layer between the radiant energy from the sun and the liquid within channel 28. One method of preventing bubble formation is to wet upper interior panel surface 40 with a wetting agent added to the liquid.

An example (herein called Example A) of such a wetting agent, in an embodiment wherein panel 27 and its channels 28 are composed of polycarbonate, is Neodol 25-9 (a 9 mole ethoxylate of a linear $C_{12}$ alcohol) added as part of a diluted wetting agent mixture comprising 10 drops of said Neodol 25-9 in one half quart of 50% ethyl alcohol in turn diluted with an equal part (one half quart) of $H_2O$. Half of the diluted wetting agent mixture described in the preceding sentence was added to the liquid in a solar heating system having a total volume of liquid circulating in the system of 8.6 gallons (about 36 liters) including the diluted wetting agent mixture (slightly more than one-half quart) with the balance consisting essentially of additional water. When there is added to Example A about 0.31 g/l* linear alkyl benzene with 0.45 g/l defoamer**, the result is an agent which will wet the carbon particles as well as the panel. With this dual wetting agent, the ratio of undiluted wetting agent (straight, undiluted Neodol 25-9 plus linear alkyl benzene sulfonate) to total liquid circulating in the panel is about 0.32 gm. per liter. On a volume % basis, the amount of undiluted wetting agent in the system is far less than 1%, and even the mixture of undiluted wetting agent plus defoamer and 50% ethyl alcohol is less than 1% of the system, by volume.

*g/l refers to grams of ingredient per liter of total liquid circulating in the system (8.6 gals. or about 36 liters).

**The defoamer may be a conventional, commercially available defoamer.

Other examples of wetting agents for the panel are set forth below in the following table.

| | Amount | |
|---|---|---|
| Ingredient | Example B | Example C |
| Neodol 25-9 | .01 g/l* | .01 g/l |
| Alpha olefin sulfonate | .35 g/l | — |
| Sodium ether sulfate | .17 g/l | .34 g/l |
| Defoamer** | .70 g/l | .5 g/l |
| 50% ethyl alcohol | .25 l | .25 l |
| Water | .25 l | .25 l |

*g/l refers to grams of ingredient per liter of total liquid circulating in the system (8.6 gals. or about 36 liters).

**The defoamer may be a conventional, commerically available defoamer.

Referring to the above table, the ratio of undiluted wetting agent (Neodol 25-9 plus sulfonate and/or sulfate) to total liquid in the system is 0.53 g/l for Example B and 0.35 g/l for Example C. As with Example A, the undiluted wetting agent in each of the Examples B and C constitutes far less than 1% of the volume of liquid in the system, and even the mixture of undiluted wetting agent plus defoamer and 50% ethyl alcohol is less than 1% of the system, by volume.

Each of the wetting agents in Examples B and C serve not only as wetting agents for the panel but also as wetting agents for the carbon particles, as described later below.

Another expedient for preventing bubble formation comprises introducing the liquid into channels 28, from supply header 11, without agitating the liquid at the location where the liquid enters channels 28 from supply header 11 (i.e., inlet ends 44 of channels 28). Avoidance of agitation at inlet ends 44 can be assisted by making inlet end 44 essentially flush with the adjacent interior surface of supply header 11. In other words, channel 28 should not project inwardly into the interior of supply header 11, or if it does, only minimally (e.g., 1/16th inch or less in a supply header having an inner diameter of 1⅞").

As an additional expedient for preventing bubble formation, liquid is flowed through supply header 11 and channels 28 under conditions of flow which avoid causing turbulence in the liquid. Non-turbulent flow in supply header 11 is determined by the cross-sectional area of supply header 11 and by the rate of flow of the liquid through supply header 11. Thus, for a given cross-sectional area of supply header 11, if there is turbulence, the rate of flow through supply header 11 is too great, and it should be decreased. The same is true with respect to the avoidance of turbulence in a channel 28. For a given cross-sectional area of a channel 28, if the liquid flowing therethrough is in a turbulent condition, the rate of flow should be reduced.

On the other hand, conditions of flow must be maintained which will maintain the carbon particles in suspension within the liquid. Thus, if the rate of flow of the liquid through the channels 28 is too slow, it is possible that the carbon particles may settle out. Thus, the flow conditions should be those which maintain the carbon particles in suspension in the liquid while minimizing or eliminating turbulence.

The carbon particles are typically lamp black having a particle size of 90% minus 200 mesh or an average particle size of about 74 microns, for example.

The concentration of the carbon black particles is within the range 2-5 grams per liter of liquid, preferably 3 grams per liter. If the concentration is too great (e.g., greater than 5 grams per liter) there is a tendency for the carbon particles to settle out of suspension in the liquid. If the concentration of carbon particles is too low, the efficiency with which radiation energy is absorbed and transferred to the liquid medium is low.

It is important to prevent the carbon particles from adhering to the interior surfaces 40-43 of channel 28. As an aid in preventing such adherence, the carbon particles are wetted with a wetting agent added to the liquid. When the carbon particles are lamp black, a typical wetting agent comprises 10 milliliters of 34% active linear alkyl benzene sulfonate to which has been added 10-20 milliliters of a conventional defoamer. As noted above, the total volume of liquid circulating in the system is 8.6 gals. or about 36 liters.

The linear alkyl benzene sulfonate is present in the ratio of 0.32 grams per liter of liquid circulating in the system and the defoamer is present in the ratio 0.45 milliliters per liter of liquid circulating in the system. On a volume % basis, the linear alkyl benzene sulfonate, alone, constitutes less than 0.04% of the volume of liquid in the system, and the linear alkyl benzene sulfonate plus defoamer constitutes no more than about 0.1% of the volume. Thus, in the example described above, the total volume of wetting agents and accompanying diluents and defoamers (excluding $H_2O$ as a diluent), for both the panel and the particles, is essentially no more than about 1% of the total volume of liquid circulating in the system.

Other examples of wetting agents for the lamp black particles include sodium lauryl sulfate or olefin sulfonate. A conventional defoamer is added to each in the same ratio as the defoamer is added to the linear alkyl benzene sulfonate. The concentration of these wetting agents, in relation to the liquid circulating in the system, may be the same as for the linear alkyl benzene sulfonate.

In addition, to the wetting agents described above in the three immediately preceding paragraphs, the wetting agents identified as Examples B and C in the table, above, and which are useful as wetting agents for the panel, are also useful, in the amounts described, as wetting agents for the lamp black particles. Thus, either of Examples B and C in said table may function, alone, as a wetting agent for both the panel and the lamp black particles.

Wetting the carbon particles in the liquid not only prevents them from sticking to the interior surfaces of channels 28, but, also, provides better contact between the particles and the liquid, in turn providing a better transfer of heat energy to the liquid from the particles which absorbed their energy from the solar radiation.

As noted above, liquid flowing through a channel 28 is heated by solar radiation from the sun 20 (FIG. 5), but the rate of flow of the liquid from channel inlet 44 to outlet 45 is sufficiently rapid to prevent the liquid from being heated to a temperature above its boiling point. In other words, the circulating liquid is always heated to a temperature below its boiling point.

It is important to distribute the liquid uniformly into each of the inclined channels 28. Each channel 28 is completely filled with an inclined column of liquid having a pair of opposite ends, one end at channel inlet 44 and another end at channel outlet 45. Maintained in supply header 11 is a constantly flowing supply column of liquid having upstream and downstream ends and disposed transversely to the inclined parallel columns of liquid in channels 28. Each of the inclined columns of liquid in a channel 28 is supplied with liquid from the supply column in header 11 at a location where the end of the inclined column joins the supply column, i.e., at channel inlet 44.

To provide uniform distribution of liquid into each of the inclined columns of liquid, the supply column of liquid is provided with a cross-sectional area greater than 10% of the combined cross-sectional areas of the adjoining ends of the inclined columns of liquid. In other words, the cross-sectional area of supply header 11 is greater than 10% of the combined cross-sectional areas of the inlets 44 of all the channels 28. This avoids a substantial pressure drop along the supply column in header 11 between its upstream end (adjacent inlet coupling 17) and its downstream end 46 (FIGS. 1 and 2). The cross-sectional area of supply header 11, or of the supply column therein, is less than the combined cross-sectional areas of inlets 44 on all of the channels 28, or of the adjoining ends of the inclined columns of liquid.

In one embodiment in accordance with the present invention, supply header 11 has an internal diameter of 1⅞" and a cross-sectional area of 2.76 square inches, and panel 27 has 155 channels 28 each having internal dimensions of 9/32 inches by 5/32 inches, for a combined cross-sectional area for the channels of 6.81 square inches. In this embodiment, the supply header has a cross-sectional area which is 40% of the combined cross-sectional areas of the channels (or their inlets).

Uniformity of distribution of the liquid through each of the channels 28 is important in order to assure that the liquid streams exiting the channels at outlet ends 45 are all at the same temperature. Without uniform distribution, the liquid could discharge at different temperatures from different channels, depending upon the flow rate through the particular channel.

The foregoing detailed description has been given for clearness of understanding only, and no unnecessary limitations should be understood therefrom as modifications will be obvious to those skilled in the art.

What is claimed is:

1. In a solar heating method wherein a fluid medium is heated by flowing it through a clear, inclined, panel exposed to solar radiation and having upper and lower interior surfaces spaced apart to define therebetween an inclined channel for said fluid medium, the steps comprising:
   providing said fluid medium as a liquid composed essentially of water with carbon particles suspended therein;
   wetting said carbon particles with a wetting agent added to said liquid;
   wetting at least said upper interior panel surface with a wetting agent added to said liquid;
   said wetting agents comprising an insubstantial part of said liquid;
   completely filling said channel so that said liquid is in continuous uninterrupted contact with said upper interior panel surface;
   and preventing bubble formation adjacent said upper, interior panel surface; wherein said wetting agents comprise no more than 1% by volume of said liquids.

2. In a method as recited in claim 1 wherein:
   said carbon particles comprise carbon black in a concentration within the range 2–5 grams per liter of liquid.

3. In a method as recited in claim 2 wherein:
   the concentration of said carbon black is at least 3 grams per liter of liquid.

4. In a method as recited in claim 1 wherein:
   said step of preventing bubble formation includes said step of wetting the upper interior panel surface.

5. In a method as recited in claim 4 wherein said step of preventing bubble formation comprises:
   introducing said liquid into said channel without agitating said liquid as it undergoes introduction.

6. In a method as recited in claim 5 and comprising:
   flowing said liquid through said channel in a non-turbulent condition.

7. In a method as recited in claim 1 wherein:
   said liquid is heated, by said method, to a temperature below its boiling point.

8. In a method as recited in claim 1 and comprising:
   flowing said liquid upwardly through said inclined channel.

9. In a method as recited in claim 1 and comprising:
   maintaining said carbon particles in suspension in said liquid as the liquid flows through said channel.

10. In a method as recited in claim 9 and comprising:
    flowing said liquid through said channel in a non-turbulent condition.

11. In a method as recited in claim 1 wherein said panel comprises a plurality of inclined parallel channels, said method comprising the step of:
    distributing said liquid uniformly into each of said inclined channels.

12. In a method as recited in claim 11 wherein each of said parallel channels is completely filled with an inclined column of liquid having a pair of opposite ends, said uniform distributing step comprising:
    flowing a supply column of liquid, having upstream and downstream ends, transversely to said inclined, parallel columns of liquid and in adjoining contact with one end of each;
    supplying each of said inclined columns with liquid from said supply column at the location where said one end of said inclined column joins said supply column;
    and providing said supply column of liquid with a cross-sectional area greater than 10% of the combined cross-sectional areas of said adjoining ends of the inclined columns of liquid to avoid a substantial pressure drop along said supply column between its upstream and downstream ends.

13. In a method as recited in claim 12 wherein:
    said last recited step comprises providing said supply column of liquid with a cross-sectional area less than the combined cross-sectional areas of said adjoining ends of the inclined columns of liquid.

14. In a method as recited in claim 1 wherein said wetting agents comprise no more than about 1% by volume of said liquid.

* * * * *

UNITED STATES PATENT AND TRADEMARK OFFICE
CERTIFICATE OF CORRECTION

PATENT NO. : 4,239,035
DATED : December 16, 1980
INVENTOR(S) : Richard J. Brooks and Thomas W. Marson It is certified that error appears in the above-identified patent and that said Letters Patent are hereby corrected as shown below:

Col. 3, line 2, "line 15" should be --line 14--.

Col. 7, line 27, "wherein said wetting agents" should begin a new paragraph.

Col. 8, lines 43-45, Claim 14 should be deleted.

On the title page, immediately following the Abstract, "14 Claims" should read -- 13 Claims --.

Signed and Sealed this

Twenty-fourth Day of March 1981

[SEAL]

*Attest:*

RENE D. TEGTMEYER

*Attesting Officer*   *Acting Commissioner of Patents and Trademarks*